Figure 1:
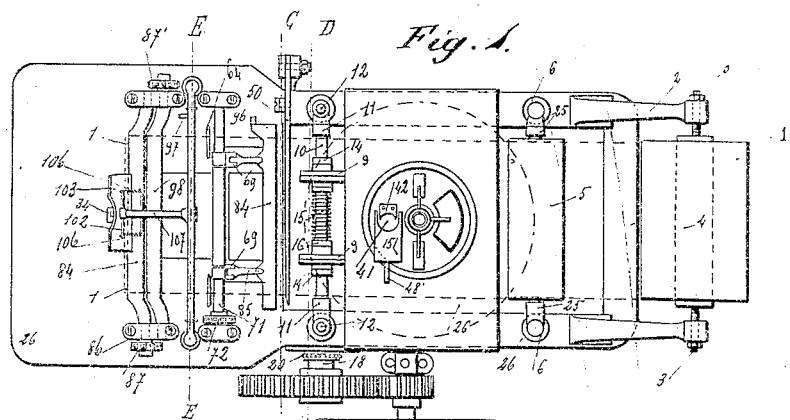

S. BERTI.
PACKING MACHINE.
APPLICATION FILED FEB. 19, 1910.

1,039,637.

Patented Sept. 24, 1912.

6 SHEETS—SHEET 1.

Witnesses

Inventor
Salvatore Berti
By James L. Norris

S. BERTI.
PACKING MACHINE.
APPLICATION FILED FEB. 19, 1910.
1,039,637.
Patented Sept. 24, 1912.
6 SHEETS—SHEET 2.
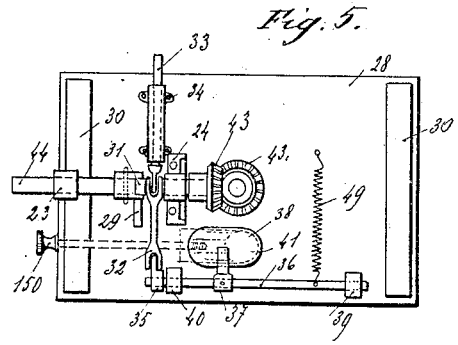
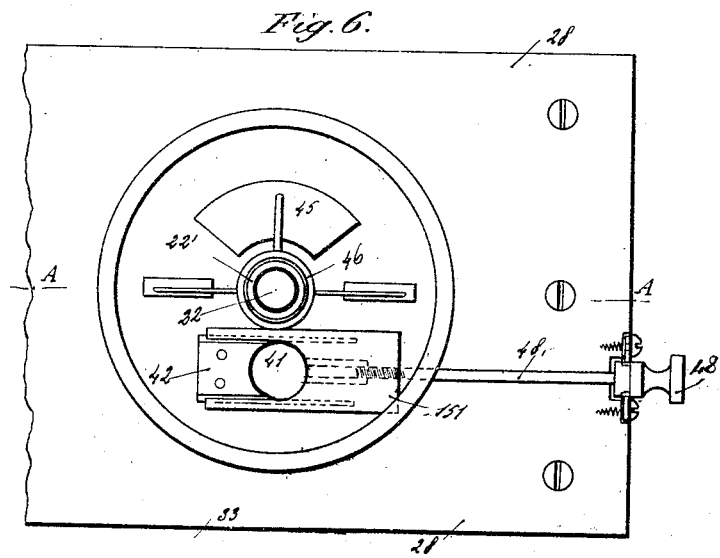
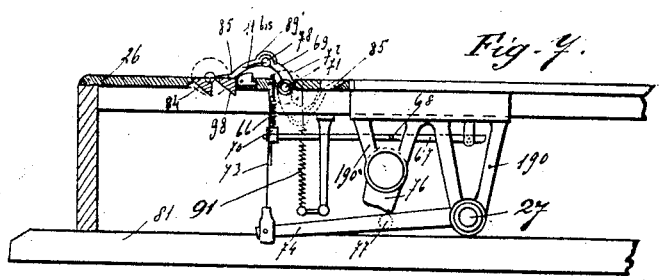
Inventor
Salvatore Berti

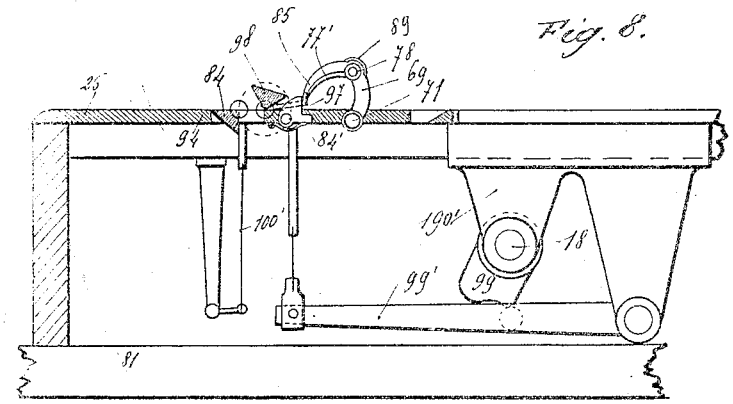
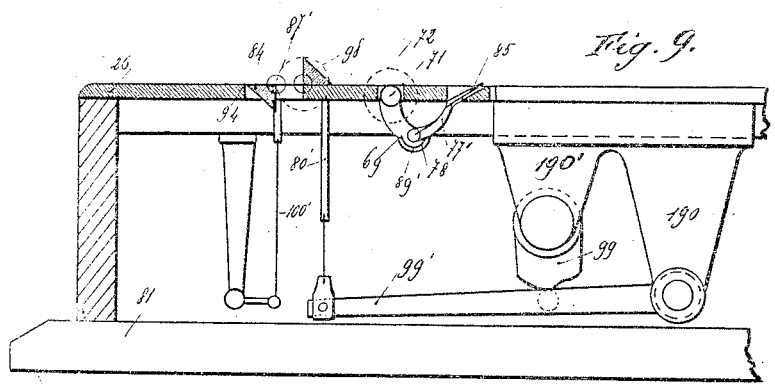
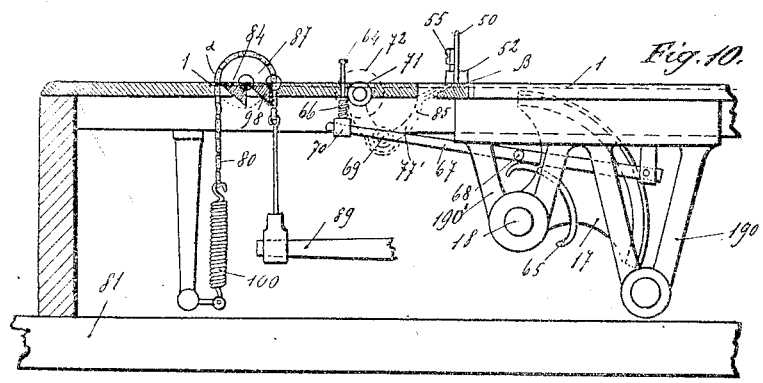

S. BERTI.
PACKING MACHINE.
APPLICATION FILED FEB. 19, 1910.
1,039,637.
Patented Sept. 24, 1912.
6 SHEETS—SHEET 4.
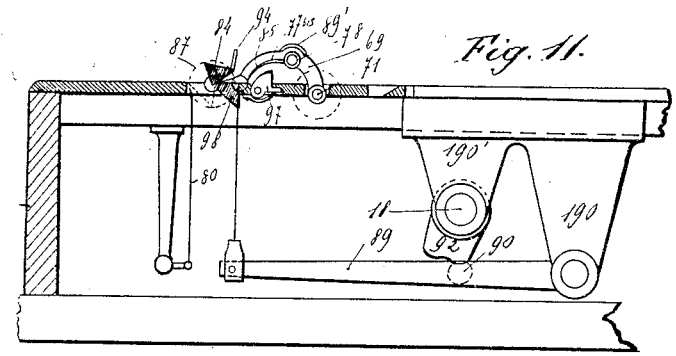
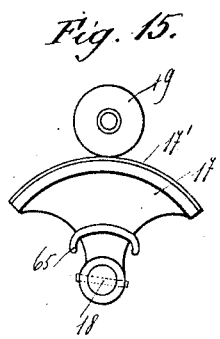
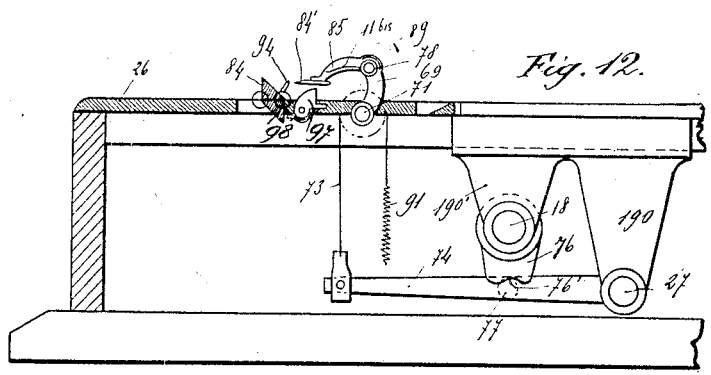
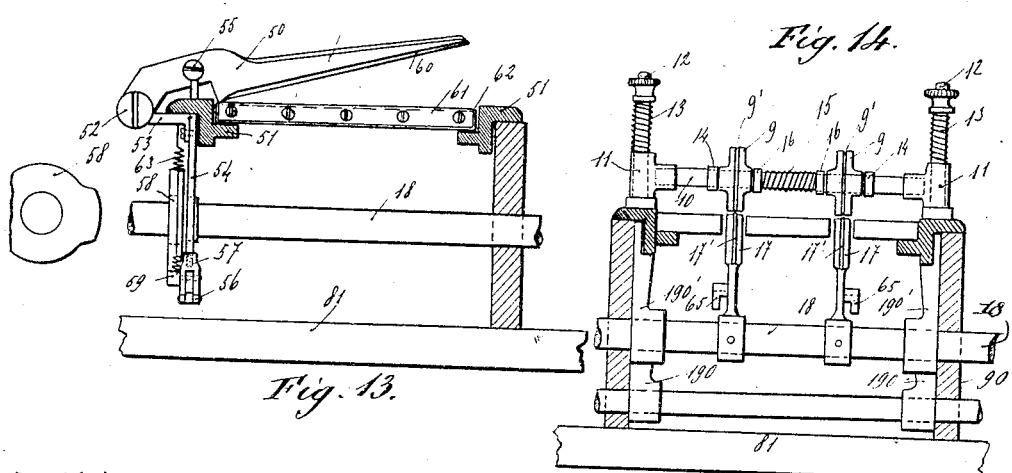
Witnesses:
Inventor
Salvatore Berti
By
James L. Norris
Atty S. BERTI.
PACKING MACHINE.
APPLICATION FILED FEB. 19, 1910.
1,039,637.
Patented Sept. 24, 1912.
6 SHEETS—SHEET 5.
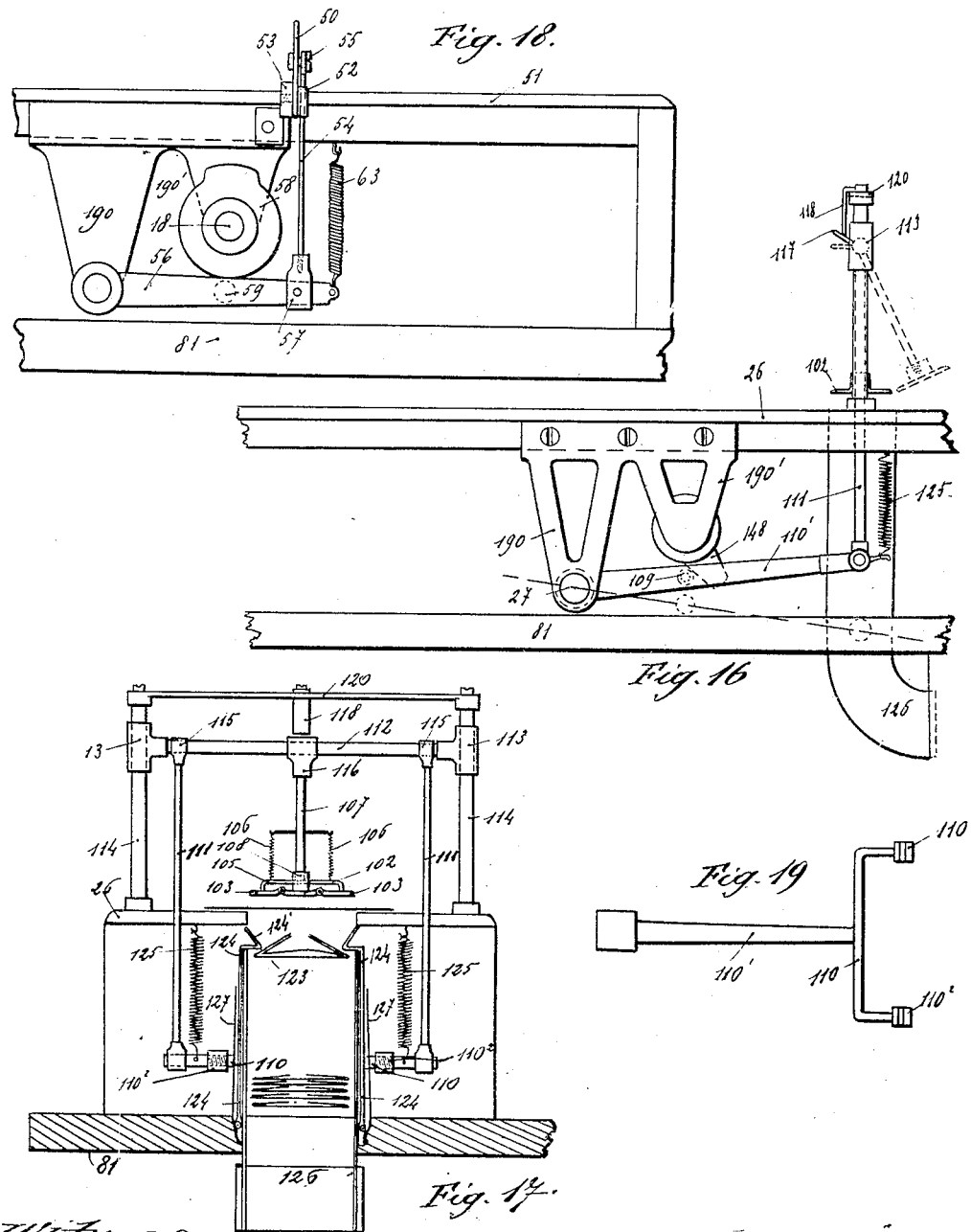

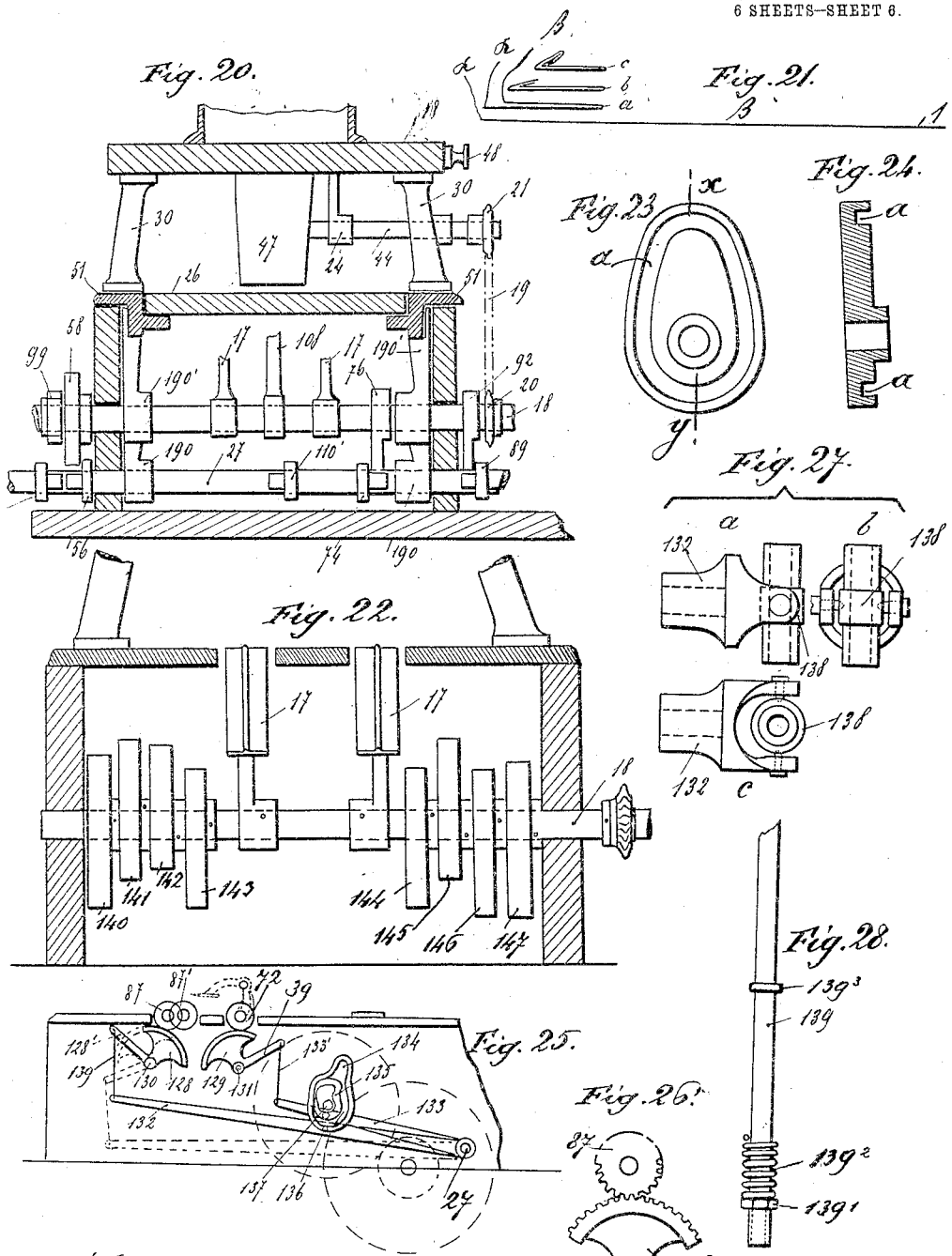

UNITED STATES PATENT OFFICE.

SALVATORE BERTI, OF RIMINI, ITALY, ASSIGNOR TO THE FIRM OF EREDI MELZI, OF MILAN, ITALY.

PACKING-MACHINE.

1,039,637.

Specification of Letters Patent.   Patented Sept. 24, 1912.

Application filed February 19, 1910. Serial No. 544,939.

*To all whom it may concern:*

Be it known that I, SALVATORE BERTI, mechanic, a subject of the King of Italy, residing at Rimini, Italy, have invented certain new and useful Improvements in and Relating to Packing-Machines, of which the following is a specification.

The machine for packing medicinal or other powders in small packets which forms the object of the present invention is represented as regards its principal parts by way of example in the construction illustrated in the accompanying drawing; its constructional details may vary in practice without departing from the limits of the invention. If a printing apparatus be added to it the machine can print upon the packets indications as to the quality of the powder and other particulars.

This machine presents the appearance of an ordinary sewing machine with table and pedal; these two parts are not, however, represented in the drawing. It can be driven by a motor or the like.

Figure 2:
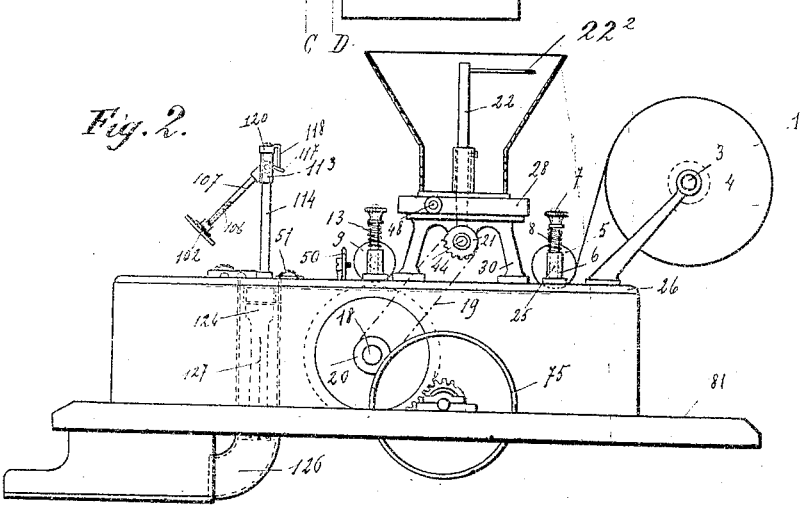
Figure 3:
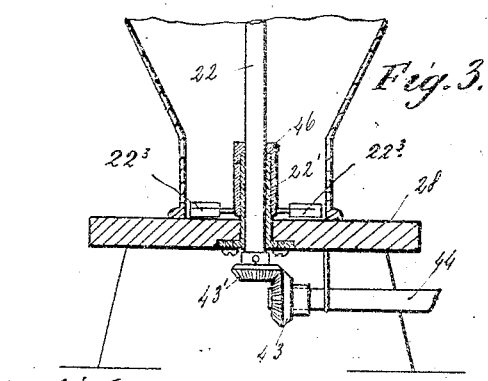
Figure 4:
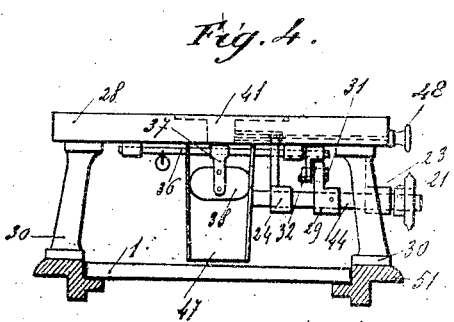

Figure 1 is a plan view of the machine with the powder reservoir indicated in dotted lines for the sake of clearness. Fig. 2 represents the machine in side elevation, showing in broken lines the part of the internal mechanism which serves for folding the small packets laterally and discharging them from the machine. Fig. 3 is a section of the measuring mechanism taken on the line A—A, Fig. 6, to a smaller scale. Fig. 4 is a front elevation of the measuring mechanism with the upper part removed for the sake of clearness. Fig. 5 is a bottom plan view of the measuring mechanism. Fig. 6 is a top plan view of the measuring mechanism on a larger scale. Figs. 7, 8, 9, 10, 11 and 12 represent details in elevation and in section of the entire folding mechanism. Fig. 13 is a detail in elevation and in section on the line C—C in Fig. 1 of the paper cutting mechanism. Fig. 14 shows in elevation and in section on the line D—D in Fig. 1 the paper conveying mechanism. Fig. 15 is a detail of same. Figs. 16 and 17 represent the mechanism which serves to fold the packet laterally and eject it from the machine. Fig. 18 is a side elevation of the paper cutting mechanism. Fig. 19 is a detail of a part associated with the lateral folding and ejecting mechanism. Fig. 20 is a transverse sectional view of the main controlling parts of the machine. Fig. 21 represents the paper in the various phases of its evolution. Figs. 22, 23 and 24 represent a modification of the means for the general control of the mechanisms. Fig. 25 illustrates a modified method of controlling some of the parts. Figs. 26, 27 (*a, b, c*) and 28 are details drawn to a larger scale.

The paper 1 (Figs. 1 and 2) which may be of any kind is arranged in the machine in a roll, this roll being supported by two brackets 2 fixed in the frame and furnished with screw pivots 3, whose ends engage the centers of the adjacent ends of the wooden roller 4 upon which the roll of paper is mounted.

The paper is initially arranged in position by hand; it then unwinds automatically. It is passed beneath a wooden roller 5 rotating upon a shaft 25 journaled in bearings 6 which are loosely mounted upon vertical screws 7 (Fig. 2) and are forced toward the work table 26 by the springs 8 encircling said screws, so that said roller will maintain the paper taut and will feed it forward, thus preventing the displacement which might otherwise take place accidentally until the paper is engaged by the disks 9. When so positioned, the paper will move forward automatically, as soon as the machine is started, under the influence of the mechanism hereinafter described.

The two disks 9 (Figs. 1, 2 and 14) are loose upon the shaft 10 which is journaled in the bearings 11 slidable vertically upon screws 12 and said disks are kept at an exact distance apart from each other by means of the interposed spring 15 which encircles said shaft and acts against two washers 16 mounted loosely thereupon, so as to cause said disks to frictionally engage two fixed washers 14. When the shaft 18, which is mounted in the supports 190', is rotated by means of its connection with the main drive shaft, the sectors 17 fixed upon said shaft 18 will rotate therewith and their peripheral ribs 17' will engage the peripheries of disks 9, which latter are depressed by the springs 13, (Fig. 14) so that the paper will be held between said sectors and disks, as the same rotate, and will be fed or advanced a distance equal to the length of the arcs through which the sectors move.

During the term that the mechanisms for successively forming the various packets, (as many as 1000 of which can be made per hour), are in operation, the measuring mechanism (see Figs. 3, 4, 5 and 6) becomes operative. This mechanism is controlled by a shaft 44, (Figs. 2 and 3), driven by the chain 19, (Fig. 2), which connects the two sprockets 20, 21, said shaft being supported in bearings 23—24, (Figs. 4 and 5), connected to a wooden table 28 that is mounted above the general work table 26 by means of its legs 30. Said legs rest upon the frame 51 which supports table 26 and is itself mounted upon table 81 of the machine, and upon table 81 is mounted the main drive shaft, the latter being provided with a pulley 75 connected with the motor or other device whereby said shaft is driven. The shaft 44 above referred to carries a cam 29 designed to engage a roller 31 fixed on the operating lever 32, (Figs. 4 and 5); one end of this lever is pivoted to a rod 33 slidably mounted in a support 34, while its other end is pivoted to an arm 35 fixed on a rock shaft 36 carried by the supports 39 and 40, so that the actuation of said lever will effect that of said rock shaft 36.

As a result of the actuation of the rock shaft, the elliptical cover 38 which is fixed thereupon by means of the arm 37 and which, in the position of repose, (Fig. 5), closes the chamber 41 from below, (Figs. 4 and 5, broken lines, and Fig. 6), opens downward, (Fig. 4), allowing the powder contained in the chamber to fall; the spring 49 then rocks shaft 36 in the opposite direction, thereby again closing chamber 41. At the same time, the pinions 43, 43′, fixed on their shafts 44, 22, impart a rotary movement to the latter shaft in such a manner that the fan-shaped cover 45, (Fig. 6) connected to the sleeve 46 secured to said shaft is brought into position to close chamber 41 from above. Sleeve 46 carries the agitators 22² and 22³, and loosely surrounds a second sleeve 22′ through which shaft 22 also loosely passes. In its fall the powder is conducted on to the paper at the proper place through the sheet metal conduit 47, (Fig. 4), and its quantity may be increased or diminished by turning the knob 48 (Figs. 2, 6 and 20) secured on one end of a rod 48′ whose other end is attached to a sliding plate 151 which latter may thus be moved forward or backward, to regulate the size of the aperture of chamber 41. The paper 1 which has already been brought into position, that is to say, to the point d, (Fig. 10), which position is likewise represented in Fig. 21 corresponding to Fig. 10, is cut at the point indicated by the letter B, by the severing mechanism represented separately in Figs. 13 and 18 which acts in the following manner: The knife 50, which is so mounted as to be capable of rocking movement in the frame 51, is pivoted at 52 to a support 53 extending from said frame, and is connected at 55 to one end of a vertical rod 54 whose other end is connected to a collar 57 on a rocking lever 56 which is pivoted, in turn, to a depending bracket 190. This lever is provided with a roller 59 which is engaged by a cam 58 mounted on the rotating shaft 18, so that the depression of said lever by said cam will effect a corresponding depression of said knife, the cutting portion 60 of the knife coacting with that of a blade 61 fixed to the plate 62, so as to sever the paper located in its path, after which the spring 63 will cause the knife to return to its initial position. When the paper is thus cut to the proper size for making a packet, the two angular fingers 64, (Figs. 1 and 10), joined to the lever 67 by the collar 70 are released from the pressure of the cam 65 against the roller 68 on said lever, (Fig. 10), are depressed by the springs 66, thus holding the paper firmly in place. At this moment the two jointed arms 69, 85, (Figs. 1, 7, 8, 9, 10, 11, 12), carrying the small plate 84′ (Figs. 1 and 12), are brought into operation by the actuation of the rock shaft 71 to which the arms 69 are secured, said shaft 71 being moved through approximately two-thirds of a revolution by the sprockets 72 driven by the chain 73, (Figs. 7 and 12). Chain 73 is actuated by means of a lever 74 which is loosely connected to shaft 27 and is provided with a roller 77 that is engaged by cam 76, shaft 27 being journaled in supports 190, as shown.

The arms 69 and 85, which are swung to the left when shaft 71 is rocked as above described, are brought into engagement with the piece of cut paper firmly held by the stops 64 and fold the same upon itself as indicated by the letter a, (Fig. 21). The small spring 77′ is held by the screw 78 on the arm 85 and serves to extend said arm and the adjacent arm 69 until stopped by the projection 89′. The said jointed arms being thus retained in a given position by the profile of the cam 76, the plate 84′ causes the outer edge of the folded piece of paper to rest upon the angular parts 84 and 98, which parts serve to fold the longer portion of the paper once in the manner indicated at b, Fig. 21, and then in the manner indicated at c in the same figure; these folders are then brought into operation. The folder 84 has a rocking movement in the supports 86, (Fig. 1) of about a half-revolution, which movement is imparted to it by the sprocket 87 and the chain 80, (Figs. 10 and 11), said chain being connected with a lever 89 controlled by cam 92, the peripheral edge of which bears upon the roller 90 carried by said lever. During its movement, said folder is turned or rocked from its normal position, (Figs. 7 and 11 in broken lines), wherein it presses against the folder 98, the ends of the paper arranged as shown at b in Fig. 21. At the same time, the cam 76 which has effected a portion of its revolution, (Fig. 12), reaches a position when the roller 77 of the lever 74 is enabled to enter its peripheral recess 76', whereupon the arms 85, 69, released by the movement of the lever will be drawn downward by the counter spring 91, (Figs. 7 and 12).

The small plate 84' moves away from the surface of the folder 84, and will come to rest at the stop 94 during the time that said folder is rocked by cam 92, so that when the said folder reaches the position where it rests with its upper side against the folder 98, the paper will have been given its first longitudinal fold, indicated at b, (Fig. 21). At this moment, the cam 76 continues its rotation, and again depresses the lever 74 downward and with it the arms 69 and 85, whereupon plate 84' is caused to move downward toward the stop 94, (Fig. 11), and to rest horizontally upon the shaft on which folder 98 is mounted, (Fig. 8), the tooth 96 on said plate, (Fig. 1), at that time engages latch 97, (Figs. 1, 7 and 8), thus preventing the said plate from moving forward when the folder 84 effects its return movement under the influence of the counter spring 100, (Fig. 10). The folder 84 having returned to its initial position, the other folder 98 is displaced; this folder also rotates in the supports 86 under the influence of the cam 99 (Figs. 8 and 9), by means of the lever 99', the chain 80' and the sprocket 87', (Figs. 1 and 9) which cause it to make approximately half a revolution while the cam 76 (Fig. 7) enables plate 84' to pass from beneath the surface of the second folder and return to its initial position, (Fig. 11, broken lines). When this movement has taken place, the cam 99 imparts a half revolution to the folder 98, (Fig. 9) and that at once leaves it free for the return movement which is produced by the counter spring 100', the two longitudinal folds in the paper represented at c, Fig. 21, being thus obtained.

It is now necessary to fold the packet laterally. With this object the folding and compressing mechanism becomes operative, (Figs. 16 and 17). This mechanism consists of a plate 102 fixed by means of the connection 108 to the rod 107 and provided at opposite sides with laterally-projecting wings 103 which are adapted to be folded downwardly bookwise but are held normally on a level with the plate 102 by the stop 105 and by the springs 106 in such a manner as to constitute a rectangular plate of the same size as the packet. The rod 107 is connected with a movable frame formed by the rods 111 connected above by the cross piece 112 and below by two nuts screwed into the sleeves 110² (see detail, Fig. 19), and guided in its vertical movement by the sleeve supports 113 sliding along rods 114 connected one with the other by the part 120. This part 120 carries an extension 118 which, when the mechanism occupies its raised position, is adapted to strike against a tappet 117 fixed to the part 116 which connects together the rod 107 and the cross-piece 112, the object being to retain said rod 107 and the plate 102 in oblique position, (Figs. 2 and 16, broken lines). When the cam 148 on shaft 18 strikes against the roller 109 fixed to a lever 110', it carries down with it the mechanism as a whole so that the latter when pressed downward, will, owing to its weight, assume a vertical position. Then, when the cam 148 no longer engages the roller 109, the counter springs 125 of the lever 110' press the entire mechanism upward, the tappet 117 encountering the extension 118 will cause the rod 107 and the small plates 102 and 103 to resume their oblique position. During the descent of the mechanism, the two plates 103 will encounter in their travel the packet 123 which has already been folded longitudinally and will fold over its two sides until released by the two lugs 124' provided upon movable plates 124 held by springs 127 against the walls of the discharge conduit 126. The lateral folding of the paper is facilitated by the fact that the disks 9 are peripherally channeled, as indicated by the numeral 9', (Fig. 14), and that the sectors 17 are provided with coacting longitudinal peripheral ribs. The cam 148 having completed its effective movement at the same time, the frame 110, 110², 111, 112, will be returned to its initial position by the springs 125. The plates 103, in folding downward under the influence of the pressure exerted thereon by the two spring-controlled lugs 124', will leave the completely folded and compressed packet at the proper place in the conduit 126.

The modified construction illustrated in Figs. 22, 23 and 24 relates to a method of controlling the mechanism by means of the shaft 18, instead of the method represented in Fig. 20. It resides in the fact that instead of the cams 92, 76, 108, etc., the shaft 18 carries the cams 140, 141, 143, 142, 144, 145, 146, 147 connected with the several operative parts of the machine by the intermediary of rocking levers like those previously described. The difference consists in the fact that the rollers fixed to the levers and intended for sliding along the periphery of the said cams, are guided in a groove formed in one of the faces of the cam. Figs. 23 and 24 show by way of example a cam of the kind described above, in front elevation and in section on the line x—y, respectively. As will be seen, the cam is provided with a groove a parallel with its contour. Fig. 25 shows the operation of two of these cams.

The modification illustrated in Figs. 25 to 28 relates to a different method of controlling the jointed arms 69, 85 and the folders 84 and 98, replacing the chains previously described. The sprockets 72, 87 and 87' are operated by toothed sectors 128, 129, (see also the detail, Fig. 26) pivoted at 130 and 131, respectively. They are provided with arms 128', 129', connected by rods 139 and 133' with the levers 132, 133 loosely mounted on the shaft 27 (see Fig. 25) and provided with pins 136, 137, engaging in the grooves in the cams 134, 135 mounted on the main shaft 18, as explained above.

The special method of connecting the rods 139, 133' with the levers 132, 133, and eventually with the arms 128', 129' of the sectors 128, 129 is shown in Figs. 27ª, 27ᵇ and 27ᶜ, which are, respectively, a side elevation, a front elevation and a plan view, and Fig. 28. This method comprehends the forking of the free ends of the levers, and, also, of the arms of the sectors, and the provision of a rocking sleeve 138 in each fork, which permits the passage of the corresponding rod therethrough. This rod is maintained depressed in the sleeve by means of the nut 139' surmounted by a spring 139² serving to absorb shocks arising in the operation of the machine and is provided above the sleeve with a projecting stop 139³.

I claim as my invention:

1. In a packet forming mechanism, the combination of a support for a sheet of paper; means for feeding said sheet along said support; means for clamping said sheet in position upon said support; means operated by said feeding means for holding said clamping means in inoperative position during the feeding operation; and separate mechanisms for folding said sheet longitudinally upon itself, folding the longitudinal edges of said sheet over upon the upper of the two portions produced by the first folding operation, and subsequently folding said sheet laterally.

2. In a packet-forming mechanism, the combination of a support for a sheet of paper; means for feeding said sheet along said support; means for clamping said sheet in position upon said support; means for holding said clamping means in inoperative position during the feeding movement comprising a lever connected to said clamping means and a cam connected to said feeding means and operative upon said lever for actuating the latter, to move the clamping means away from said support; and folding means operative upon said sheet while the sheet is held by said clamping means.

3. In a packet-forming mechanism, the combination of a support for a sheet of paper; means for feeding said sheet along said support; means for clamping said sheet in position upon said support; means for holding said clamping means in inoperative position during the feeding movement comprising a lever connected to said clamping means and a cam connected to said feeding means and operative upon said lever for actuating the latter, to move the clamping means away from said support; and, separate mechanism for folding said sheet longitudinally upon itself folding the longitudinal edges of said sheet over upon the upper of the two portions produced by the first folding operation, and subsequently folding said sheet laterally, while the sheet is held by said clamping means.

4. In a packet-forming mechanism, the combination of a support for a sheet of paper; means for feeding the sheet along said support; spring-controlled fingers for clamping said sheet in position upon said support; means for raising said fingers into inoperative position and for holding them in such position during the feeding movement; and folding means operative upon said sheet while the same is held by said fingers.

5. In a packet-forming mechanism, the combination of a support for a sheet of paper; means for feeding the sheet along said support; spring-controlled fingers for clamping said sheet in position upon said support; means for raising said fingers into inoperative position and for holding them in such position during the feed movement comprising a lever with which the fingers are connected and a cam connected to said feeding means and operative upon said lever; and folding means operative upon said sheet while the same is held by said fingers.

6. In a packet-forming mechanism, the combination of a support for a sheet of paper; means for feeding the sheet along said support; spring-controlled fingers for clamping said sheet in position upon said support; means for raising said fingers into inoperative position and for holding them in such position during the feed movement comprising a lever with which the fingers are connected and a cam connected to said feeding means and operative upon said lever; and separate mechanisms for folding the sheet longitudinally upon itself, folding the longitudinal edges of said sheet over upon the upper of the two portions produced by the first folding operation, and subsequently folding the sheet laterally, while the sheet is held by said fingers.

In testimony whereof I affix my signature in presence of two witnesses.

SALVATORE BERTI.

Witnesses:
  B. CARLO SALVOTIE,
  LYLE ROBB.